Jan. 17, 1939.  A. E. JURS  2,144,113
LIQUID LEVEL INDICATOR
Filed June 27, 1936   3 Sheets-Sheet 2
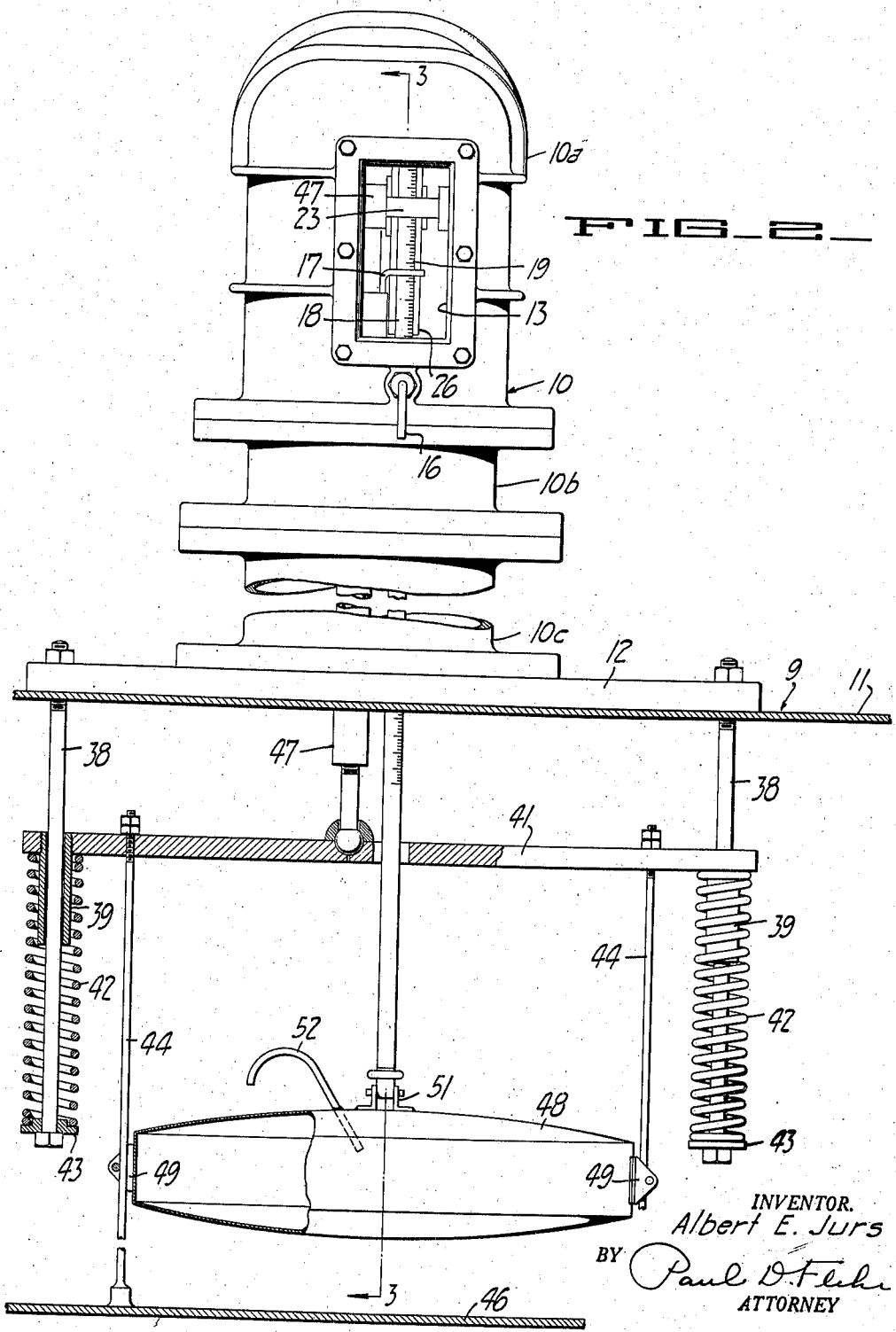
FIG_2_
INVENTOR.
Albert E. Jurs
BY
Paul D. Flehr
ATTORNEY

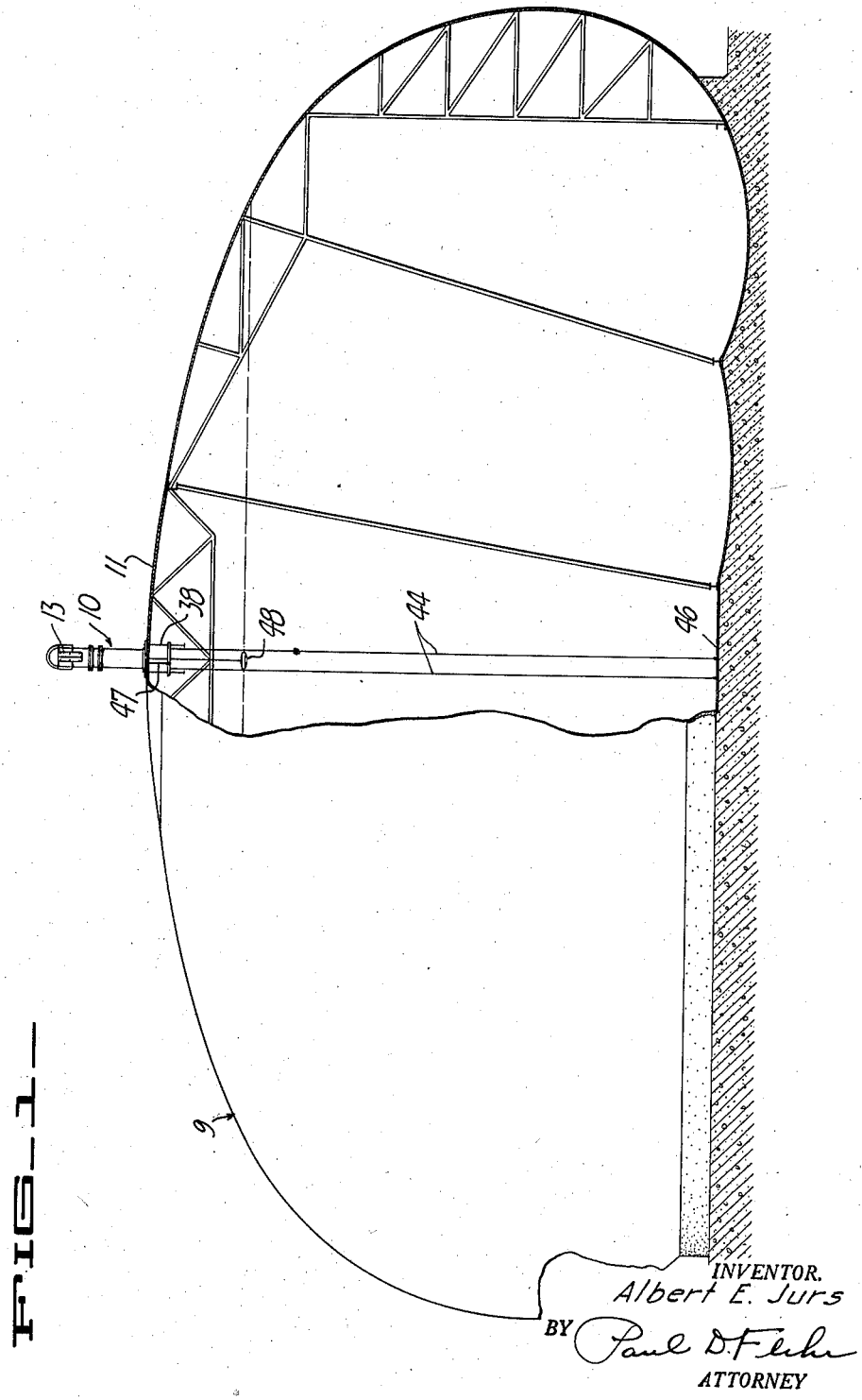

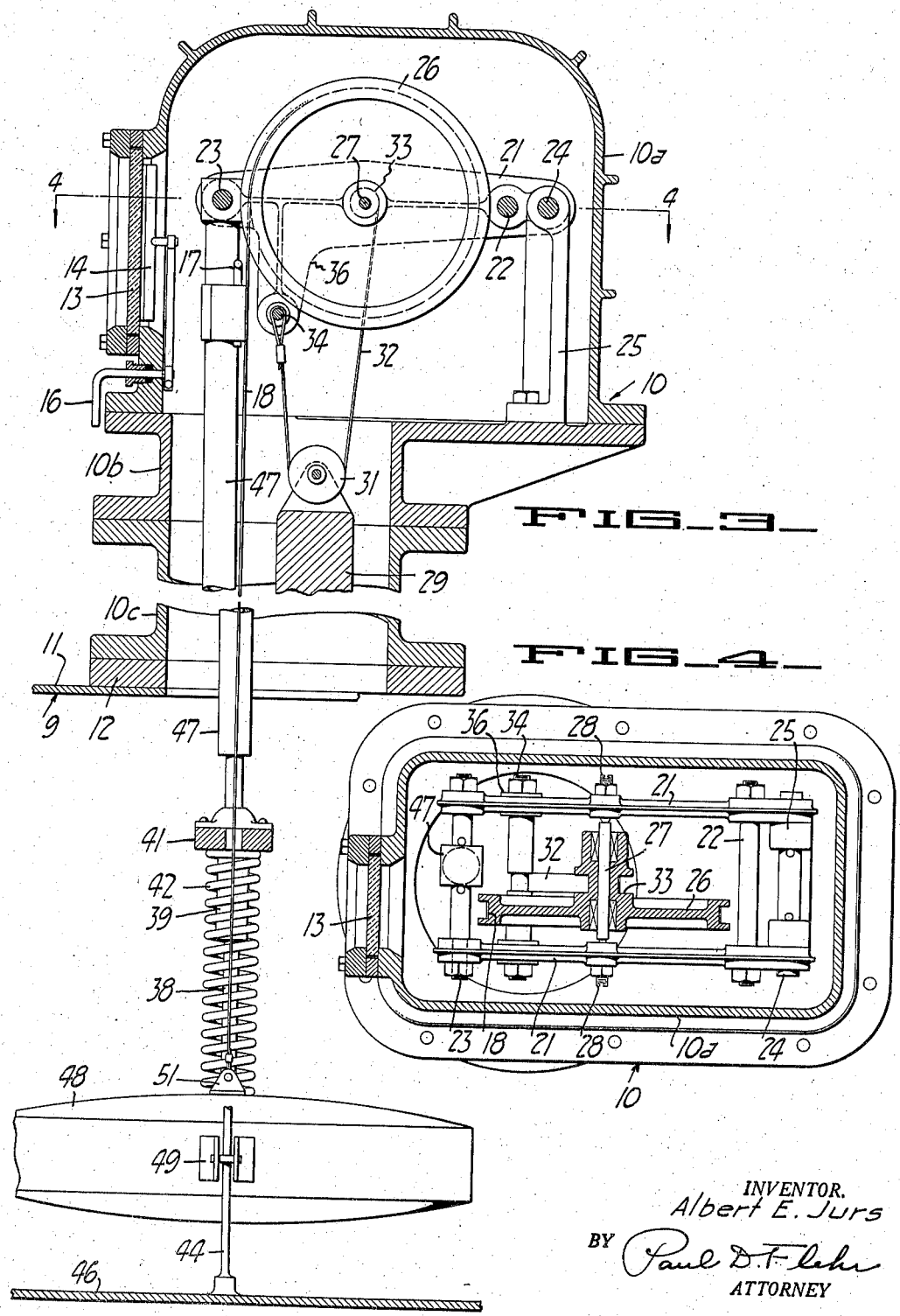

Patented Jan. 17, 1939

2,144,113

UNITED STATES PATENT OFFICE 2,144,113

LIQUID LEVEL INDICATOR

Albert E. Jurs, Piedmont, Calif.

Application June 27, 1936, Serial No. 87,723

6 Claims. (Cl. 73—321)

This invention relates generally to level gauges or indicating apparatus, such as are suitable for use in conjunction with liquid storage tanks.

It is an object of the invention to provide apparatus of the above character, which will maintain accurate readings, even though the wall upon which the exterior parts of the apparatus are mounted, may shift its elevation with respect to the bottom of the tank.

Another object of the invention is to provide level indicating apparatus suitable for use with storage tanks where the interior of the tank must remain sealed with respect to the atmosphere, as for example tanks containing volatile petroleum products.

Further objects of the invention will appear from the following description in which the preferred embodiment of the invention has been set forth in detail in conjunction with the accompanying drawings.

Referring to the drawings:

Fig. 1 is a side elevational view, partly in cross-section, showing my apparatus applied to a tank for storage of volatile and inflammable hydrocarbon products.

Fig. 2 is a side elevational view, partly in cross-section, showing the manner in which the connections are established to a liquid float, and to the bottom of the tank with which the apparatus is employed.

Fig. 3 is a cross-sectional view taken along the line 3—3 of Fig. 2, and showing the mounting of the indicating elements.

Fig. 4 is a cross-sectional view taken along the line 4—4 of Fig. 3.

Referring first to Figs. 2 to 4 inclusive, the apparatus illustrated consists of a casing 10, adapted to be mounted upon the wall 11 of a liquid storage tank. For convenience in manufacture and assembly, the casing 10 can be sectionalized, and as illustrated it is formed of an upper section 10a, intermediate section 10b, and lower section 10c. The lower section 10c is shown mounted upon the base plate 12, which in turn is secured to the tank wall 11. The various casing sections are suitably clamped together to provide a vapor tight seal with respect to surrounding atmosphere. The top casing section 10a is provided with a window 13, through which an operator may view the indicating elements. This window can be provided with an inner wiper 14, operated by an exterior lever 16.

Within the casing 10 are the relatively movable or co-operating indicating elements 17 and 18. Element 18 can conveniently be in the form of a flexible metal ribbon, carrying graduations or indicia 19. Element 17 can be in the form of a pointer or straight edge, which extends over the graduated face of the metal ribbon 18, as viewed through the window 13 in Fig. 2.

Supporting or mounting means is provided for the elements 17 and 18, of such a character that the casing may partake of vertical movements with respect to the indicating elements, without affecting the accuracy of the indication. The mounting means in this instance consists of a pair of spaced arms 21, which are rigidly connected together by the bolts 22 and 23. Adjacent the bolt 22, the arms are pivotally connected to a shaft 24, which in turn is carried by support bracket 25. The metal ribbon 18 is wound upon a reel 26, which is disposed between the spaced arms 21, and carried by the shaft 27. The ends of shaft 27 are journalled to the arms 21, as by means of the journal pins 28. As a means for biasing the reel 26 in one direction, namely in a clock-wise direction, as viewed in Fig. 3, a winding weight 29 can be provided. The pulley 31 carried by this weight is engaged by a flexible metal ribbon 32, one end of which is wound upon a spindle 33 fixed to reel 26, and the other end of which is anchored to the arms 21. The representative anchoring means shown consists of a bolt 34, which connects together depending arm portions 36.

The operating parts described above are connected to a float or like means responsive to variations in the level of liquid, and to a point of fixed elevation, namely, the bottom of the storage tank. The parts illustrated to provide such connections are as follows: Extending downwardly into the interior of the tank, from the top wall 11, are the guide rods 38. The upper ends of these rods can be conveniently secured to the base plate 12. Guide tubes 39 slidably engage the rods 38, and these tubes are in turn connected by a cross-bar 41. Springs 42 surround the rods 38, below the ends of the cross bar 41. The lower ends of the springs are seated upon washers 43, while the upper ends urge the bar 41 upwardly. Tie rods 44 establish a connection between the bar 41, and the bottom 46 of a storage tank. A relatively rigid tube or rod 47 has its lower end attached to an intermediate point of bar 41, and has its upper end pivotally attached to the bolt 23 (Figs. 3 and 4). Thus while the casing 10 may move upwardly or downwardly a limited amount, together with wall 11, the connecting rod 47 remains stationary, and maintains the free ends of arms 21 relatively stationary with respect to the bottom of the tank. The upper end of tube 47 can be employed as a convenient mounting for the pointer 17.

Disposed within the tank and below the cross bar 41, there is a suitable float 48. As representative of suitable guide means, this float is shown provided with side clips 49, which slidably engage the tie rods 44. A suitable attachment 51 serves to connect the depending end of the flexible metal ribbon 18, to the float. Assuming that the float is made hollow and of sheet metal, it can be provided with a breather tube 52, to enable the pressure within the same to be equalized with respect to pressure within the tank.

Fig. 1 illustrates a representative installation of my indicating apparatus, in conjunction with a storage tank suitable for use with petroleum products. The tank 9 in this instance is made of sheet metal, and the top wall 11 upon which the casing 10 is mounted, is subject to variations in elevation, depending upon variations in the vapor pressure within the tank.

Operation of my apparatus can be briefly described as follows: The float 48 takes a position depending upon the depth of liquid within the tank, and the position of the float determines the positioning of the metal ribbon 18. Therefore an operator may read the liquid level by observing the graduations 19, through the window 13. In the event there is a shift in the elevation of the casing 10, with respect to the bottom of the tank, due to flexing or vertical movement of the tank wall 11, the level indication remains accurate, because the pointer 17 and flexible ribbon 18 remain stationary. This is because of the connection to the bottom of the tank through rods 44, cross bar 41 and rod 47. Arms 21 pivot about the axis of shaft 24, to accommodate changes in the level of casing 10, but such movement does not affect the relative positioning between pointer 17 and ribbon 18. Springs 42, which are normally maintained under compression, are for the purpose of maintaining tension upon the tie rods 44, thus making possible the use of relatively light tie rods, without the danger of buckling. Weight 29 biases the reel 26 a sufficient amount to maintain the metal ribbon tensioned, without however, asserting sufficient upward pull to overcome the weight of the float 48.

I claim:

1. An indicating means of the character described applicable for use with a tank having a movable wall, a casing adapted to be mounted upon said wall, a mounting arm disposed within the casing and having one end of the same pivotally connected to the casing, whereby the free end of the arm may remain substantially fixed while the casing moves with said wall, a reel rotatably carried by said arm, a flexible indicating element wound upon said reel, a connection between the free end of said arm and the bottom of the tank, an indicator cooperating with the flexible element and fixed with respect to said connection, and a float connected to one end of said flexible element.

2. In liquid level indicating means applicable for use with a tank having a movable wall, a casing adapted to be mounted upon said wall, a mounting member disposed within the casing, the casing being movable relative to the mounting member, a reel rotatably carried by said member, a flexible indicating element wound upon said reel, a connection between the mounting member and the bottom of the tank, an indicator cooperating with the flexible element and fixed with respect to said connection, and a float connected to one end of said flexible element.

3. In liquid level indicating means applicable for use with a tank having an upper movable wall, a casing adapted to be mounted upon the exterior side of said wall, a mounting member disposed within the casing and with respect to which the casing may move in a vertical direction, a reel rotatably carried by said mounting member, a flexible indicating element wound upon said reel and extending downwardly into the tank, a float connected to the lower end of said flexible element, a connection between said mounting member and the bottom of the tank, and a second indicating element cooperating with said flexible element and fixed with respect to said last named connection.

4. Indicating means of the character described applicable for use with a tank having an upper movable wall, a casing adapted to be mounted upon said wall, a mounting arm disposed within the casing and having one end of the same pivotally connected to the casing for pivotal movement about a horizontal axis, a connection between the free end of said arm and the bottom of the tank, whereby said movable wall together with said casing may move in a vertical direction without causing corresponding vertical movement of the free end of said mounting arm, a float disposed within the tank, a reel carried within the casing, an indicating tape carried by the reel, one end of the tape extending downwardly from the reel in vertical alignment with the free end of the arm, an indicator disposed within the casing and fixed with respect to said connection, said indicator cooperating with the indicating tape, and a connection between the depending end of the tape and the float.

5. In indicating means of the character described applicable for use with a tank having an upper movable wall, a casing adapted to be mounted upon said wall, a mounting member disposed within the casing and with respect to which the casing may move in a vertical direction, a reel rotatably carried by said mounting member, a flexible indicating element wound upon said reel and extending down into the tank, a connection between said mounting member and the bottom of the tank, an indicator fixed with respect to said connection and cooperating with said flexible element, a float connected to the lower end of said flexible element, and means carried by said mounting member to bias said reel in a direction to tension said flexible element.

6. In indicating means of the character described applicable for use with a tank having an upper movable wall, a casing adapted to be mounted upon said wall, a mounting arm disposed within the casing and having one end of the same pivotally connected to the casing, a reel rotatably carried by said arm, a flexible indicating element wound upon said reel, one end of the element extending downwardly from the reel, a connection between the other end of said arm and the bottom of the tank, a float connected to the lower end of said flexible element, means for biasing said reel in a direction to tension said flexible element, and a second indicating element disposed in cooperating relationship to said flexible element and fixed with respect to the connection between the arm and the bottom of the tank, whereby the level indications are not affected by movements of the casing and wall in a vertical direction.

ALBERT E. JURS.